June 2, 1953     W. I. JONES     2,640,243

SNAP FASTENER STUD INSTALLATION

Filed July 8, 1949

INVENTOR:
WALTER I. JONES,
By John Todd
ATTORNEY.

Patented June 2, 1953

2,640,243

UNITED STATES PATENT OFFICE 2,640,243

SNAP FASTENER STUD INSTALLATION

Walter I. Jones, Somerville, Mass., assignor to United-Carr Fastener Corporation, Cambridge, Mass., a corporation of Massachusetts Application July 8, 1949, Serial No. 103,548

4 Claims. (Cl. 24—219)

My invention aims to provide improvements in fastener constructions (preferably snap fastener stud installations) particularly where the supporting medium is flexible material such as rubber, knit goods and the like.

A specific use for my invention is a bathing cap fastener stud attachment.

In the drawings which illustrate preferred embodiments of my invention:

Figure 1:
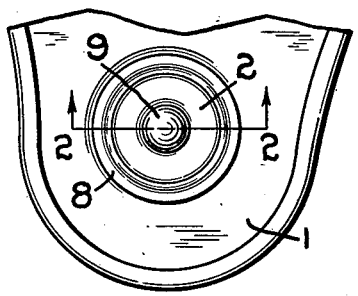
Fig. 1 is an elevational view of a portion of a bathing cap showing the attachment of a snap fastener stud.

Snap fasteners have been used extensively on bathing caps as a means of holding the chin strap in position. Usually snap fastener studs have been attached to the cap near the ear-covering portions and adjustable slide sockets have been attached to opposite ends of the chin strap.

The snap fastener studs have heretofore been attached to the cap by either hollow open end rivets, hollow tacks, or chisel ended hollow rivets. None of these has been entirely satisfactory because they pierced holes in the bathing cap material. If the material is pinched tight between the flanges of the studs and attaching elements, and then a pull exerted, the rubber would stretch and cause an unsightly pucker around the flanges. If the rubber is not pinched tightly between the flanges, then a pull on the rubber would expose the hole punched or slit by the attaching member and might cause a tear in the rubber or the fastener stud to unbutton from the cap.

My invention overcomes these objections in a simple but very efficient manner without increasing costs or changing the cap material.

Referring now to the embodiment of my invention illustrated in Figs. 1 through 6 of the drawings, I have specifically applied my invention to a bathing cap. In this case the cap or supporting medium 1 is rubber, and I have attached thereto a snap fastener stud 2 of conventional construction by means of a stud-attaching rivet 3.

The rivet 3 is formed from sheet metal and has a flange 4 and a hollow barrel 5. It is important that this rivet barrel 5 have a closed end 6, and I prefer to have opposed pinched-in portions 7—7 (Figs. 4, 5 and 6) near the end to assist in collapsing the end of the barrel during the attaching operation. I have also found that it is helpful to anneal the rivet slightly, especially when made of brass or steel. This helps to provide for a proper collapsing of the barrel.

Figure 3:
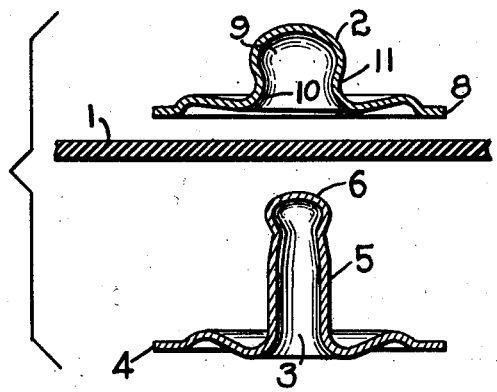
Fig. 3 is an enlarged sectional view of the parts of the stud installation before assembly.
Figure 6:
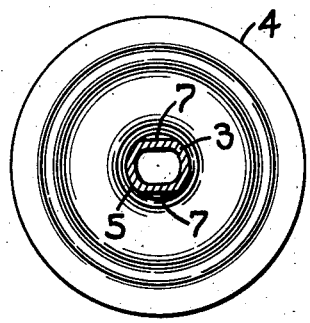
Fig. 6 is a section of the eyelet taken on the line 6—6 of Fig. 5.

The stud 2 has a flange 8 and a hollow head portion 9 with a restricted opening 10 formed by a neck 11, as shown in Fig. 3.

Figure 2:
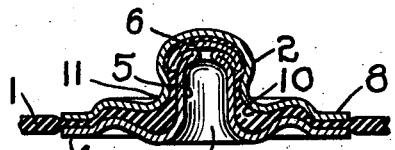
Fig. 2 is an enlarged section taken on the line 2—2 of Fig. 1.
Figure 5:
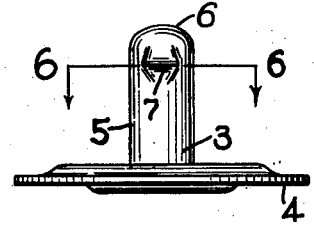
Fig. 5 is a side elevation of my improved stud-attaching eyelet.
Figure 4:
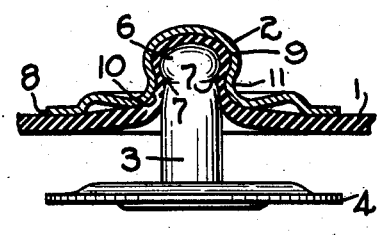
Fig. 4 is a section of the parts shown in Fig. 3, but assembled to the point of the beginning of collapse of the eyelet barrel.

An important feature of my invention is the relative cross-sectional dimensions of the restricted opening 10 of the stud and the barrel 5 of the rivet. Ordinarily these dimensions are such that the barrel of the rivet is the same or slightly larger than the restricted opening, but in my invention the cross-sectional dimension of the barrel 5 is substantially smaller than the dimension of the restricted opening 10. This is to permit the resilient material, such as rubber, to pass up into the hollow head and surround the barrel 5 without being cut by the rivet, as shown in Figs. 2 and 4.

In assembling my improved construction, the stud 2 and rivet 3 are held in suitable tools of an assembly machine (not shown) and the rubber held between them, as shown in Fig. 3. Thereafter the machine is operated to cause the stud and rivet to be moved toward each other. During this operation the end of the rivet barrel forces the rubber up into the hollow head, without cutting, as shown in Fig. 4. As the relative movement of the parts continues, the closed end 6 of the barrel 5 collapses, aided by the pinched-in portions 7—7, as shown in Fig. 2. The rubber is stretched and thinned during this final clinching operation but is substantially or entirely free from being cut. Thus, the rubber 1 is held tightly between the collapsed rivet and the inner face of the stud head. The flanges 4 and 8 of the rivet and stud grip the rubber especially near their outer edges (Fig. 2), but preferably not tight enough to prevent some freedom of movement of the rubber between the flanges.

When my construction is complete and a pull is exerted on the rubber, adjacent to the stud assembly, the rubber may stretch from between the flanges, but it will not tear free and expose a hole, as is the case with other known constructions. Furthermore, the rubber will return to normal position between the flanges and not leave a pucker around the flanges as in other known constructions.

Figure 7:
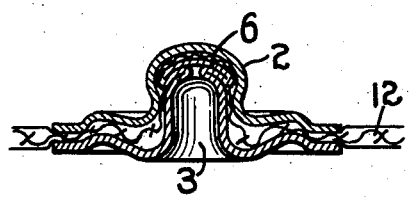
Fig. 7 is a section like Fig. 2 except that the carrying medium is knit material instead of rubber.

I have found that my invention is also useful where the flexible carrying medium is woven or knit material because it does not cut holes and allow the material to unravel when placed under strain. In Fig. 7 I have shown a cross section of my assembly using woven or knit material 12.

While I have illustrated and described preferred embodiments of my improved construction, my invention is best defined by the following claims.

I claim:

1. A snap fastener stud installation for imperforate thin flexible rubber and like articles, such as a bathing cap, comprising in combination with the material of said article a snap fastener stud part having an imperforate hollow dome-shaped head with a contracted neck joining said head to a lateral base flange, and a hollow rivet for attaching the stud to the material of the article, said rivet having an elongated tubular shank and an imperforate dome-shaped head at one end thereof and a lateral base flange extending from the shank at the opposite end thereof, said rivet shank being telescoped and upset within the hollow stud head and within the imperforate material of the article, the latter being stretched into said stud head and neck and gripped tightly between the head and neck of the stud and the upset head and shank of the rivet, the base flanges of said stud and rivet gripping the material less tightly than by said telescoped stud and rivet parts, thereby permitting stretching of the article material adjacent to said stud and rivet while the gripped portion therebetween remains tightly held in position.

2. A snap fastener stud installation for thin flexible rubber and like articles such as a bathing cap, comprising in combination with the material of said article a snap fastener stud having an imperforate hollow dome-shaped head and a restricted neck portion and an attaching rivet having an elongated shank and an imperforate dome-shaped head at one end thereof upset within the head and the material of the article, said material being stretched into the head and neck of the stud and held tightly between the inner faces of the head and neck of the stud and the outer faces of the upset head and shank of the rivet, thereby permitting stretching of the material of the article adjacent to said stud and rivet while the gripped portion remains tightly held in position, the stud and rivet each having flanges disposed on opposite sides of the article material, said flanges holding the article material less tightly than gripped by the opposed stud and rivet heads thereby to permit the material to return between the flanges when stretched out from between said flanges and thereupon released.

3. A separable fastener element assembly comprising in combination with a stretchable imperforate supporting medium a hollow stud part and an attaching rivet part disposed on opposite sides of said medium, said stud part having a hollow dome-shaped head with a contracted tubular neck and an annular flange extending outwardly from the open end of said neck providing a support-engaging base, and said attaching rivet part having an elongated hollow shank of substantially less diameter than said contracted stud neck and an annularly flanged support-engaging base at one end thereof, the opposite end of said rivet shank being imperforate and dome-shaped and of less diameter than the internal diameter of the stud dome head, said rivet shank being indented on opposite sides below said dome-shaped imperforate head so that upon axial compression within the hollow stud head the sides of said shank will be folded under said imperforate dome-shaped rivet head while being expanded radially, the diameter differences between said stud and rivet parts permitting the stretchable supporting medium to be secured and disposed between said stud and rivet part whereby the supporting medium is held between the telescoped dome-shaped heads of said stud and rivet parts free from any appreciable cutting by said rivet thereby providing an assembly that is free from tendency of the stretchable medium to pull loose from between the assembled stud and rivet parts.

4. A snap fastener stud construction for attachment to a stretchable imperforate support comprising in combination with said support a stud part having an imperforate hollow dome-shaped head with a contracted neck joining said head to a lateral support-gripping base flange, and a hollow rivet for attaching said stud part to a stretchable support, said rivet having an imperforate dome-shaped head and an elongated tubular shank provided with a lateral support-engaging flange spaced from said imperforate head, said rivet shank and head being of substantially less diameter than the contracted neck of said stud so that when said rivet is telescoped into said hollow stud from an opposite side of the support the material of the support will be stretched over and around said rivet head and shank, said rivet shank being upsettable within said stud head upon axial compression to grip without cutting supporting material against inner surfaces of said stud head and neck, said stud and rivet flanges being adapted to grip opposed surfaces of supporting material disposed therebetween.

WALTER I. JONES.

References Cited in the file of this patent

UNITED STATES PATENTS

| Number | Name | Date |
|---|---|---|
| 446,139 | Richardson | Feb. 10, 1891 |
| 691,308 | Devine | Jan. 14, 1902 |
| 691,953 | White | Feb. 11, 1902 |
| 2,111,664 | Gross | Mar. 22, 1938 |
| 2,160,374 | Veillette | May 30, 1939 |

FOREIGN PATENTS

| Number | Country | Date |
|---|---|---|
| 12,529 | Great Britain | June 15, 1899 |
| 482,977 | Great Britain | Apr. 8, 1938 |